(12) United States Patent
Chumbley et al.

(10) Patent No.: US 6,420,994 B1
(45) Date of Patent: Jul. 16, 2002

(54) VOLUME IN SPACE LOCATOR

(75) Inventors: Philip E. Chumbley, Aurora; Suzanne Kennedy Rajchel, Wheaton; Michael Gerard Ressl, Western Springs, all of IL (US)

(73) Assignee: VantagePort, Inc., Western Springs, IL (US)

( * ) Notice: Subject to any disclaimer, the term of this patent is extended or adjusted under 35 U.S.C. 154(b) by 0 days.

(21) Appl. No.: 09/332,609

(22) Filed: Jun. 14, 1999

Related U.S. Application Data

(60) Provisional application No. 60/089,382, filed on Jun. 15, 1998.

(51) Int. Cl.[7] ............................. G01S 13/74; G01S 3/02
(52) U.S. Cl. ........................... 342/43; 342/42; 342/118; 342/146; 342/147; 342/175; 342/176; 342/195; 342/450; 342/451
(58) Field of Search ............................ 342/27, 29–32, 342/36–40, 42–51, 149, 118, 127–147, 175–186, 190–197, 450–465; 340/870.01, 870.02, 870.03, 870.07, 500, 501, 505, 531, 539, 540, 673, 674, 825.06, 825.36, 825.54, 825.55, 572.4

(56) References Cited

U.S. PATENT DOCUMENTS

| | | | | |
|---|---|---|---|---|
| 3,665,464 A | * | 5/1972 | Meilander | 342/36 |
| 4,104,629 A | * | 8/1978 | Isbister et al. | 342/43 |
| 5,892,478 A | * | 4/1999 | Moss | 342/149 |
| 5,952,922 A | * | 9/1999 | Shober | 340/572.4 |

* cited by examiner

Primary Examiner—Bernarr E. Gregory
(74) Attorney, Agent, or Firm—Cardinal Law Group

(57) ABSTRACT

Methods and apparatus for determining location information corresponding to a volume in space (VIS) that is occupied by a selected target from a remote observation platform through the process of collecting an identification signal from a source at or near the selected target and associating VIS location information data with that signal to identify location information corresponding to the VIS occupied by the target.

11 Claims, 4 Drawing Sheets

VOLUME IN SPACE LOCATOR

CROSS-REFERENCE TO RELATED APPLICATIONS

This application claims the benefit of U.S. Provisional Application No. 60/089,382 filed on Jun. 15 1998, the information therein hereby incorporated into this application by reference.

FIELD OF THE INVENTION

This invention relates to remotely determining location information corresponding to any physical volume in space (VIS) occupied by a selected target, and more particularly to methods and apparatus for identifying location information corresponding to any VIS occupied by a selected target from any location remote from the selected target.

BACKGROUND OF THE INVENTION

The ability to accurately determine the address, location or identity of various structures from remote locations has a potentially large market. Accurate identification of addresses from a distance can greatly simplify and decrease response times of emergency and delivery services. Such remote identification can be used by police, fire, ambulance and other types of emergency services, overnight delivery services, the postal service, utility services, pizza delivery personnel, meter-reading personnel, golf courses, railroads, military vehicles, and by the general public for personal uses.

Automatic identification systems currently in use are limited to determining the identity of selected targets in close proximity to such identification systems. For instance, identification systems have been used in packaging where an identifying number has been encoded in an electronic integrated circuit "chip" and the unit is energised by a magnetic field and then responds electronically or vice-versa. Maximum working distance for this technology is about one meter. Railroads have used bar code technology, to remotely identify rail cars. The working distance for this technology is at most ten meters, and even less as the cars become dirty. Both of these technologies can only identify targets in close proximity, such as products or equipment, not the physical coordinates of the VIS that they may occupy. Neither of these technologies come even close to providing ranges that could even be associated with systems that remotely sense location information corresponding to any particular VIS occupied by a selected target.

Range-finders are commonly used to determine the distance of a selected target relative to an observation platform. Range-finders provide no location information about the VIS that the selected target occupies.

Various radio direction finding (RDF) and global positioning system (GPS) technologies are capable of providing different degrees of information about the VIS that any observation platform occupies. They provide no such information about the the VIS that any selected target occupies.

Thus there is a need for the methodology and apparatus for accurately determining location information corresponding to any VIS occupied by a selected target from a distance.

SUMMARY OF THE INVENTION

The invention comprises methods and apparatus for determining location information for any VIS that is occupied by a selected target from a remote observation platform through the process of collecting an identification signal from a source at or near the selected target and associating VIS spatial coordinate or location information data with that signal. As part of that association. VIS spacial coordinate or location information corresponding to the observation platform may be combined with spatial coordinate or location information about the VIS occupied by the selected target gathered at the observation platform. In one particular embodiment, a wireless signal source at or near the selected target may be interrogated from the observation platform to produce an identification signal that corresponds to VIS location information that can be extracted from the signal or a separate database. In another particular embodiment, VIS location information corresponding to the observation platform using RDF or GPS techniques can be combined with spatial coordinate information measured between the observation platform and the selected target using range-finding and directional navigation techniques to determine VIS location information for the selected target.

One aspect of the invention comprises a method of determining location information corresponding to a VIS occupied by it selected target from a remote observation platform, comprising the steps of: transmitting an interrogation signal from the observation platform toward the target to retrieve target information data associated with the target that is stored proximate the selected target; transmitting a response signal from proximate the target toward the observation platform that comprises the target information data in response to the interrogation signal; and associating information about the response signal transmitted toward the observation platform with VIS location information to identify location information corresponding to the VIS occupied by the target. Another aspect of the invention comprises an apparatus for determining the location information corresponding to a VIS occupied by a selected target from a remote observation platform, comprising: means for transmitting an interrogation signal from the observation platform toward the target to retrieve target information data associated with the target that is stored proximate the selected target; means for transmitting a response signal from proximate the target toward the observation platform that comprises the target information data in response to the interrogation signal; and associating information about the response signal transmitted toward the observation platform with VIS location information to identify location information corresponding to the VIS occupied by the target.

DESCRIPTION OF THE EMBODIMENTS

The invention pertains to methods and apparatus that enable users to access stored or databased location information, in both a pull and push mode, pertaining to a selected target in any particular VIS. such as a building, a transformer on a utility pole or an inventory location. Examples of such databased location information comprise, and are not limited to, house addresses, Emergency Services Disaster Administration (ESDA) chemical inventories, military equipment inventories, and restaurant menus. Typically the databased location information is made available to the user in a convenient manner consistent with accepted standards as VIS location information by simply pointing to a selected target from the user's position or observation platform.

The invention is easily interfaced with general-purpose computing systems, and optionally communications networks, to easily facilitate the retrieval of pertinent VIS location information from databases, wherever they are stored, search those databases and provide the user with an interface to input the desired search terms and output the results of that search to the user as the desired VIS location information. The invention is also easily interfaced with wireless communication or positioning systems, such as fixed or mobile communications networks and GPS systems to determine VIS location information for a selected target from the user's observation platform.

It should be understood that "VIS location information" as used herein in connection with the description of the embodiments of the invention that are described below means any information that relates to an identified VIS or target therein. This may include, for instance, any useful information about or related to the target. As an example, if the target is a restaurant, "VIS location information" relating to the target may include the name of the restaurant, a menu, hours of operation, and a phone number for reservations. It may also include advertisements about other businesses that maybe of interest to the user that identifies the target.

The invention may be applied by extracting information for the VIS occupied by a selected target from data received from or proximate the selected target that is independent of the VIS occupied by the user's observation platform or by combining data received from or proximate a selected target with data corresponding to the VIS occupied by the user's observation platform. These two approaches may be considered different embodiments of the invention that are described below.

Figure 1:
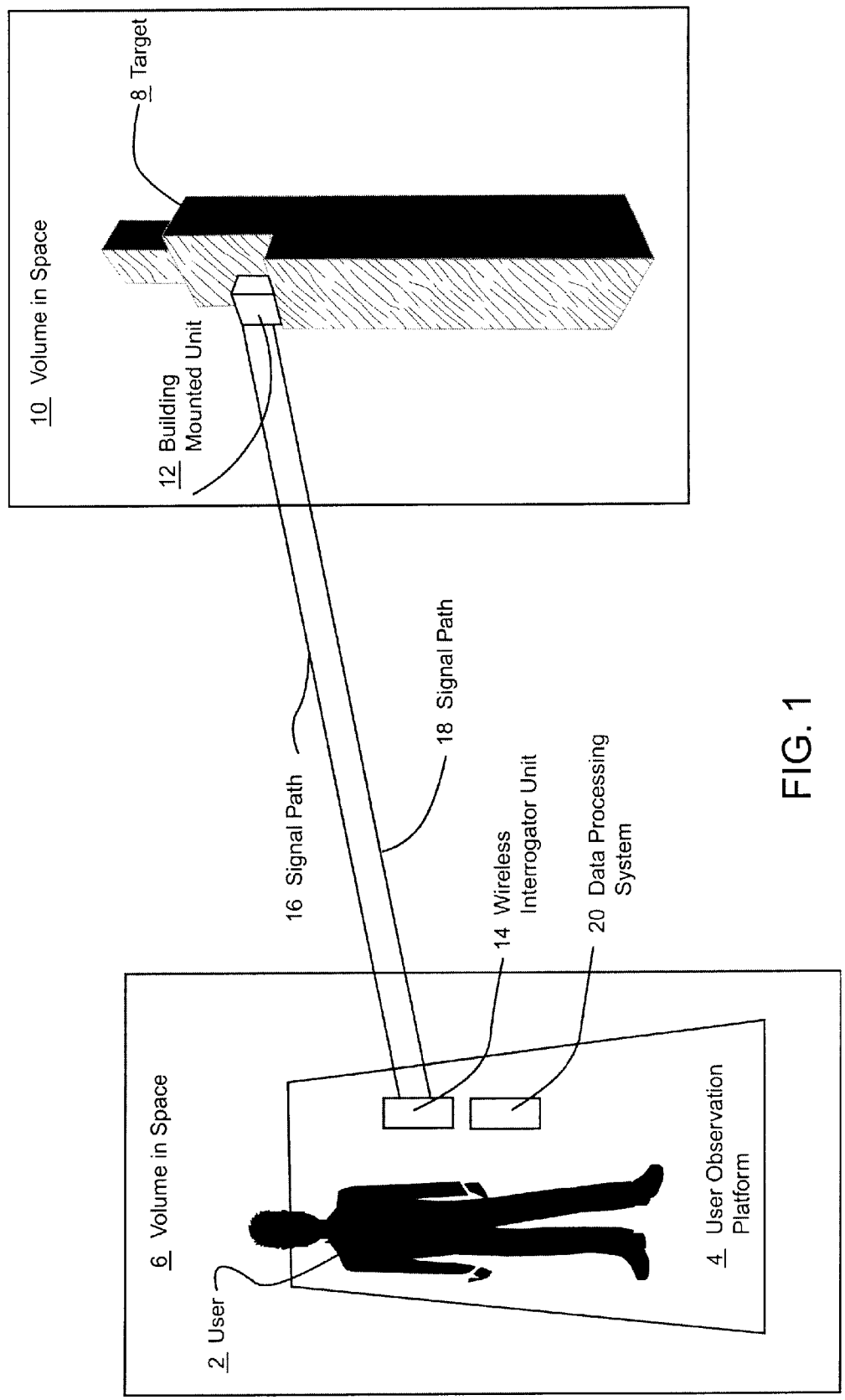
FIG. 1 shows a first embodiment of the invention.

The first embodiment of the invention derives information about the identity or location of the VIS occupied by a selected target independently of any information relating to the VIS occupied by the user's observation platform. Referring to the drawings, wherein reference characters represent like or corresponding parts throughout the views, FIG. 1 shows a basic implementation of the first embodiment. A user 2 is shown within a user observation platform 4 that occupies a first VIS 6. The user 2 selects a target 8, such as a building, that occupies a second VIS 10. The user observation platform 4, the target 8, or both, may be stationary or moving relative to each other or to an independent reference platform (not shown).

The user 2 interrogates a wireless signal source such as a building mount unit (BMU) transponder 12 located on or proximate the target 8 within the second VIS 10. Interrogation of the transponder 12 by the user 2 is conveniently accomplished with a wireless interrogator unit 14 that is placed with or proximate the user 2 within the first VIS 6. The user 2 triggers the interrogator 14 to send a wireless interrogation signal to the transponder 12 along a signal path 16. The transponder 12 responds to the receipt of the interrogation signal with a wireless response signal sent back to the interrogator 14 along a signal path 18 that includes data associated with the second VIS 10.

The transponder 12 is most advantageously of the passive type so that no power source is required to activate it. In one form, the transponder 12 may be of the wavelength-selective reflecting type, whereby it selectively reflects pre- determined wavelengths of wireless signals of the optical, radio frequency, or ultra-sonic type. The pre-determined wavelengths that are reflected are then conveniently associated with the data associated with the second VIS 10. Thus, if the interrogator 14 sends an interrogation signal to the transponder 12 along the path 16 that comprises a broadband wireless signal, such as a beam of light, the response signal that the transponder 12 returns to the interrogator 14 along the path 18 will typically comprise a combination of discrete wavelengths that represents data corresponding to the second VIS 10. The data in the response signal returned to the interrogator 14 is then analysed and associated with VIS location information by a data processing system 20 to extract VIS location information corresponding to the second VIS 10. The data processing system 20 may have one or more of its components remote from the observation platform 4.

The transponder 12 may also be of the passive wavelength-selective cavity type, wherein the transponder 12 comprises one or more cavities or voids that resonate at pre-determined wavelengths of wireless signals of the optical, radio frequency, or ultra-sonic type. In this case, the pre-determined wavelengths that resonate in the cavities of the transponder 12 are then conveniently associated with the data associated with the second VIS 10. The response signal in this case will continue to radiate after the interrogation signal terminates because of the resonant cavities. Thus, if the interrogator 14 sends an interrogation signal to the transponder 12 along the path 16 that comprises a broadband wireless signal. such as a radio frequency beam, the response signal that the transponder 12 returns to the interrogator 14 along the path 18 will typically comprise a combination of discrete wavelengths that represents data corresponding to the second VIS 10 that may be monitored even after the interrogation signal ceases. This can prevent any "swamping out" of the response signal by the much stronger interrogation signal in the first VIS 6 where the observation platform 4 of the user 2 is located. The data in the response signal returned to the interrogator 14 is then analysed and associated with VIS location information to extract VIS location information corresponding to the second VIS 10 in the same way.

Another suitable passive transponder 12 may utilize wavelength-selective optically responsive materials that are excited to fluorescence by an optical interrogation signal from the interrogator 14. In this case, the response signal that the transponder 12 returns to the interrogator 14 along the path 18 will typically comprise a combination of discrete wavelengths of fluorescence that represents data corresponding to the second VIS 10 that may be monitored even after the interrogation signal ceases, since the materials will continue to fluoresce. As with the case of the passive transponder 12 using cavities, this transponder 12 provides a response signal that is more resistant to being "swamped out." Once again, the data in the response signal returned to the interrogator 14 is then analysed and associated with VIS location information to extract VIS location information corresponding to the second VIS 10.

Of course, the transponder 12 may alternatively be of the active type, wherein it may generate its own response signal without utilising the energy of the interrogation signal, but such an interrogator then requires its own source of power to remain operational. In most instances, a transponder 12 of the passive type is preferred.

Figure 2:
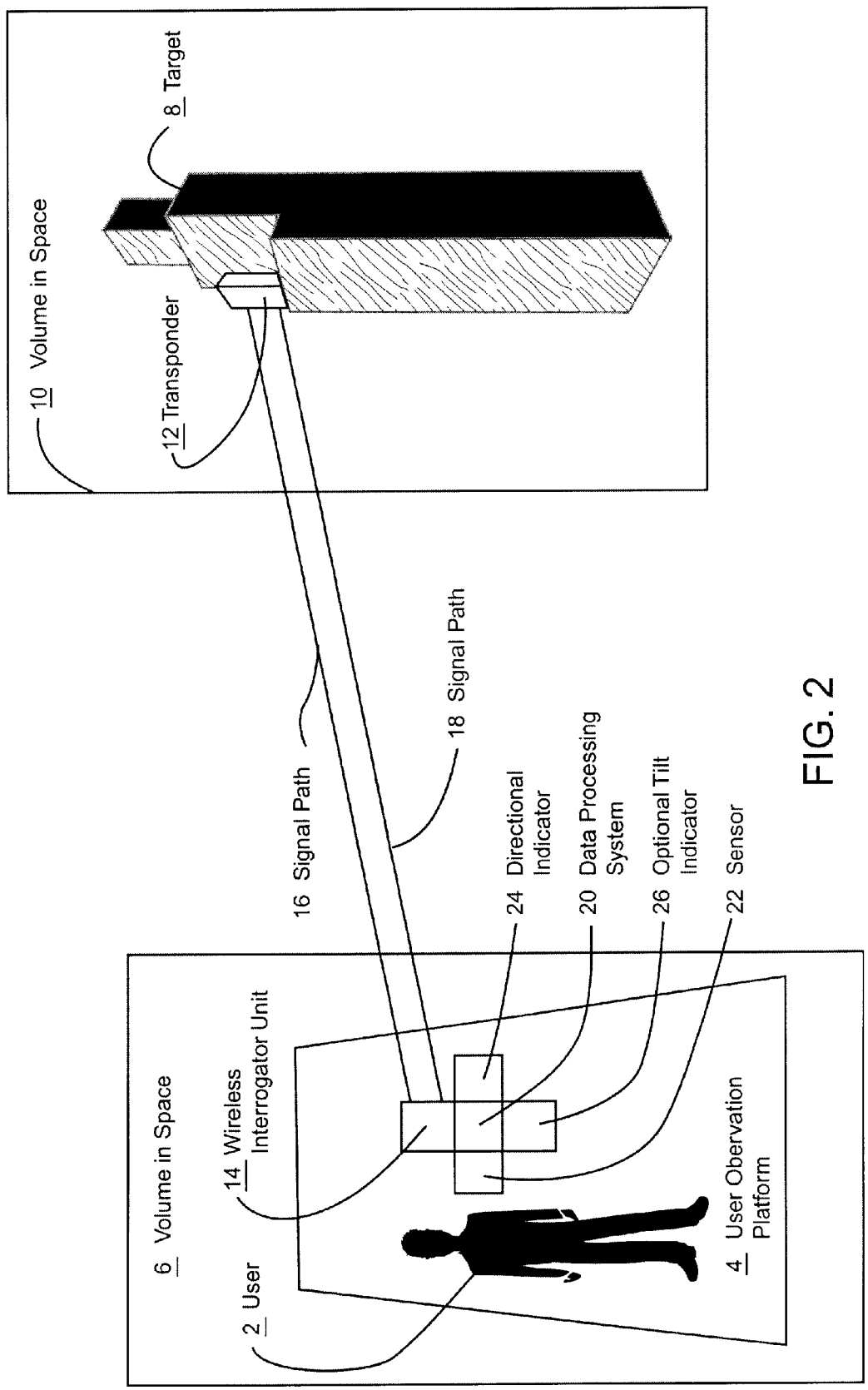
FIG. 2 shows a second embodiment of the invention.

The second embodiment of the invention extracts location information for the VIS occupied by a selected target from data received from or proximate the selected target by combining data received from or proximate a selected target with data corresponding to the location of the VIS occupied by the user's observation platform. FIG. 2 shows a basic implementation of the second embodiment. A user 2 is shown within a user observation platform 4 that occupies a first VIS 6. The user 2 selects an target, such as a target 8, that occupies a second VIS 10. As with the first embodiment described above in connection with FIG. 1, the user platform 4, the target 8, or both, may be stationary or moving relative to each other or to an independent reference platform (not shown).

The second embodiment also utilises a transponder 12 and an interrogator 14 with an interrogation signal sent along a path 16 and a response signal sent along a path 18 in the same way as with the first embodiment shown in FIG. 1. However, the second embodiment also comprises a local positioning sensor 22 that is placed with or proximate the user 2 on the observation platform 4 that occupies the first VIS 6. The local positioning sensor 22 may comprise a GPS receiver or a specialised dedicated RDF positioning system that uses dedicated or existing wireless communication towers, such as are used for mobile communication and wireless "cellular" or "personal communication system (PCS)" telephone applications. The local positioning sensor 22 determines the position of the first VIS 6 that the observation platform 4 of the user 2 occupies. It also may establish a North-South axis on a horizontal plane of the observation platform 4 from which to relate the position of the second VIS 10 that the target 8 occupies, the elevation of the observation platform 4, and even the velocity of the observation platform 4 if it is moving.

The second embodiment also comprises a directional indicator 24, such as a compass linked to the local positioning sensor 22 or a magnetic compass, to indicate the relative direction of the second VIS 10 from the first VIS 6, and optionally a tilt indicator 26, such as a spirit level, to indicate the inclination of the second VIS 10 relative to the first VIS 6. In this embodiment. the user 2 aims the interrogator 14 at the target 8. The directional indicator 24 is coupled to the interrogator 14 to determine the horizontal coordinates of the target 8. The optional tilt indicator 26 is also coupled to the interrogator 14 to determine the inclination of the target 8 relative to the user 2.

The period required for the response signal from the transponder 12 to be intercepted by the interrogator 14 after the interrogator 14 sends out the interrogation signal may optionally be used to determine the distance between the user 2 and the target 8. Thus, the interrogator 14, the directional indicator 24 and, optionally, the tilt indicator 26 serve as a relative target-finding system. In this case, the interrogator 14 may act as a range-finder, and the measured distance of the target 8 from the user 2, the relative horizontal coordinates of the target 8 relative to the user 2 measured by the directional indicator 24, the angle of inclination of the target 8 relative to the user 2 as measured by the optional tilt indicator 26 and the determined position of the user 2 may all be analysed and associated with VIS location information by a VIS data processing system 20 to determine the position of the second VIS 10 that the target 8 occupies.

Alternatively, the relative target-finding system may comprise only the interrogator 14 and the directional indicator 24 if the inclination of the target 8 relative to the observation platform 4 is of no significance, or even as little as the directional indicator 274 alone if the distance of the target 8 from the observation platform 4 is of no importance. The data processing system 20 in any case may have one or more of its components remote from the observation platform 4.

In both the first and second embodiments of the invention as described above in connection with FIGS. 1 and 2. it may be convenient for the user 2 to have an auxiliary means for accurately selecting the target 8 with the interrogator 14 from the observation platform 4. particularly when the interrogation beam is not of the optical type. This auxiliary means for selecting the target 8 (not shown) may be in the form of an auxiliary beam of light, such as from a collimated laser source or light-emitting diode, or an optical finder telescope, either of which may be affixed to the interrogator 14.

The first and second embodiments of the invention as described above in connection with FIGS. 1 and 2 may take the form of a stand-alone system or may be integrated with other equipment. Examples of other equipment with which these embodiments may be integrated comprise, and are not limited to, laptop general-purpose computers, hand-held computing devices, mobile telephones, portable scanning devices, and remote control devices. In any case, the distinguishing feature of the embodiments so utilised is that they identify, locate, or both identify and locate a selected VIS and allow a database of stored information regarding the selected VIS to be queried, either locally or remotely, based on the identification or location of the selected VIS. The selected VIS need not be fixed in its location over time, nor does the database have to reside in a fixed location.

Figure 3:
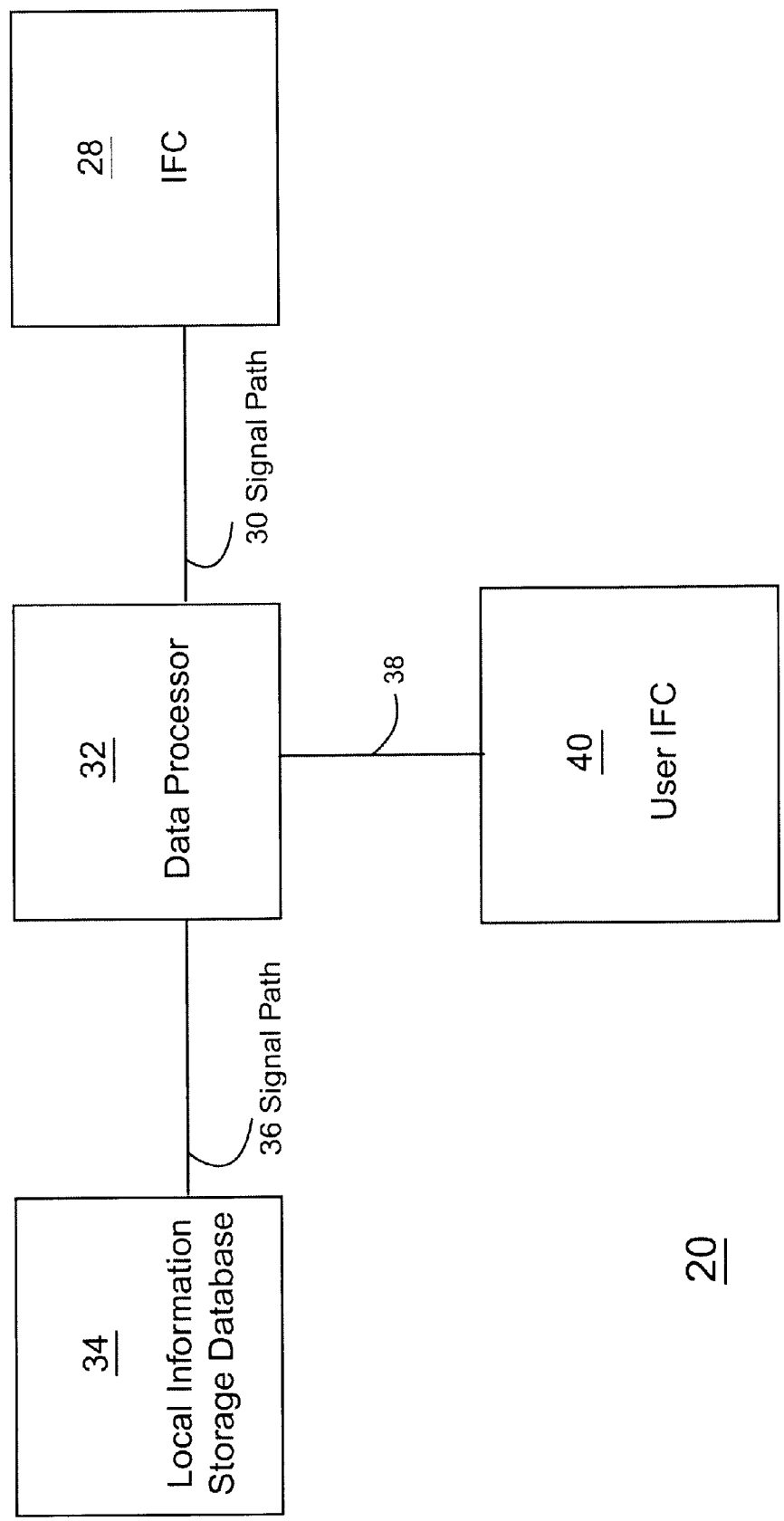
FIG. 3 shows an arrangement for integrating a VIS database on the observation platform for the embodiments of the invention shown in FIGS. 1 and 2.

For both embodiments as described above in connection with FIGS. 1 and 2, the VIS data processing system 20 that is used to analyze and associate stored VIS location information with measured data may be integrated on the observation platform 4 along with the other components. or be segregated away from the other components on the observation platform 4. FIG. 3 shows an arrangement for integrating a VIS data processing system on or proximate the observation platform 4 for the embodiments of the invention shown in FIGS. 1 and 2.

In FIG. 3, measured data from the interrogator 14, in the case of the first embodiment, or the interrogator 14, the local position sensor 22, the direction indicator 24 and the inclination sensor 26 in the case of the second embodiment, is transferred through a communication interface (IFC) 28 along a signal path 30 to a data processor 32, such as a central processing unit (CPU). VIS location information is stored in a local information storage database 34, such as electronic read-only memory (ROM) or a magnetic disc storage system, that is couple d to the data processor 32 along a signal path 36. The data processor 32 analyses the transferred data and associates it with the stored data to generate VIS location information that is fed through a signal path 38 to a display or user IFC 40.

Figure 4:
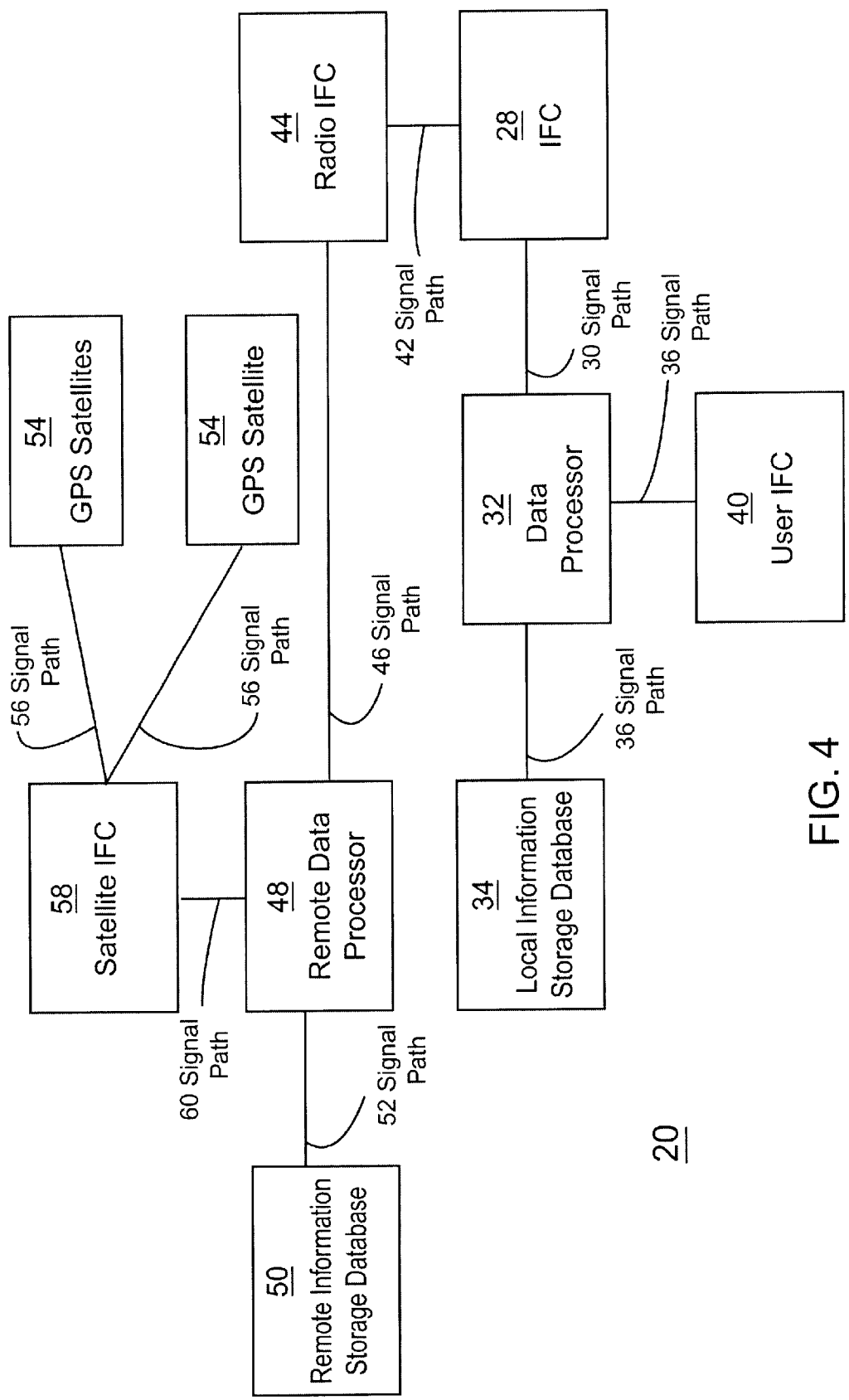
FIG. 4 shows an arrangement for segregating a VIS database away from the observation platform for the embodiments of the invention shown in FIGS. 1 and 2.

FIG. 4 shows an arrangement for segregating at least a portion of a VIS data processing system 20 away from the observation platform 4 for the embodiments of the invention shown in FIGS. 1 and 2. In FIG. 4, as in FIG. 3, measured data from the interrogator 14, in the case of the first embodiment, or the interrogator 14, the local position sensor 22, the direction indicator 24 and the inclination sensor 26 in the case of the second embodiment, is transferred through an IFC 26 along a signal path 30 to a data processor 32. In this arrangement, data is also fed from the communication IFC 26 along a signal path 42 to a radio or wireline IFC 44. The data fed to the IFC 44 is then fed along a signal path 46 a to a remote data processor 48, such as a CPU.

Remote VIS location information stored in a remote information storage database 50, such as at least one networked database server, is coupled through a signal path 52 to the remote data processor 48. The remote data processor 48 analyses the transferred data fed from the IFC 44 and associates it with the stored data from the remote database 50, and optionally with additional VIS data received from GPS satellites 54 transmitted through signal paths 56 to an optional satellite IFC 58 that is also coupled to the remote data processor through a signal path 60 to generate VIS location information. This VIS location information is then fed back to the data processor 32 through the IFC 34 and communication IFC 28 to generate user VIS location information that corresponds to the selected VIS.

Optionally, some additional VIS location information may be also be stored in a local information storage database 34, such as electronic read-only memory (ROM) or a magnetic disc storage system, that is coupled to the data processor through a signal path 36. In this case, the data processor 32 analyses the transferred data and associates it with the both the local and remotely stored data to generate VIS location information that is fed to a display or user IFC 40. In this way, local storage and computer apparatus may combine with remote information storage and computer apparatus, with any necessary handshaking and information exchange occurring through the communication channels.

Thus there has been described methods and apparatus for determining location information that corresponds to any VIS that is occupied by a selected target from a remote observation platform through the process of collecting an identification signal from a source at or near the selected target and associating VIS location information data with that signal to identify location information corresponding to the VIS occupied by the target. While the invention has been explained with reference to the embodiments described above as illustrated in the drawings, it should be understood that the invention is not limited to those embodiments but covers all other possible modifications, alternatives and equivalent arrangements included in the scope of the appended claims.

What is claimed is:

1. A method of determining location information corresponding to a volume in space, the volume in space occupied by a target, comprising the steps of:

storing, within a database, location information associated with spatial geographic coordinates of a pre-determined geographic reference coordinate system;

transmitting, from an observation platform, an interrogation signal toward the target;

receiving, at the observation platform, a response signal passively reflected from the target;

determining an observation platform spatial geographic coordinate within the pre-determined geographic reference coordinate system;

determining compass heading, angular inclination, and distance to the target, relative to the observation platform spatial geographic coordinate, by using data gathered from the reflected response signal;

determining a volume in space spatial geographic coordinate within the pre-determined geographic reference coordinate system, using the compass heading, angular inclination, distance to the target, and the observation platform spatial geographic coordinate; and associating the volume in space spatial geographic coordinate with location information corresponding to the volume in space by querying the database.

2. The method of claim 1 wherein the location information corresponding to the volume in space is selected from the group consisting of:

services associated with the volume in space occupied by the target, emergency services associated with the volume in space occupied by the target, delivery services associated with the volume in space occupied by the target, military services associated with the volume in space occupied by the target, inventory databases associated with the volume in space occupied by the target, menu services associated with the volume in space occupied by the target and utility services associated with the volume in space occupied by the target.

3. The method of claim 1, further comprising:

determining the volume in space spatial geographic coordinate using a global positioning system.

4. The method of claim 1, further comprising:

determining the observation platform spatial geographic coordinate using a system, the system selected from the group consisting of a global positioning system, a radio direction finding system and a cellular positioning system.

5. The method of claim 1, further comprising:

translating the location information to user data.

6. The method of claim 1, further comprising:

determining compass heading, angular inclination, and distance to the target, relative to the observation platform spatial geographic coordinate, by using data gathered from the interrogation signal.

7. An apparatus for determining location information corresponding to a volume in space occupied by a target, comprising.

means for storing, within a database, location information associated with geographic coordinates of a pre-determined geographic reference coordinate system;

means for transmitting, from an observation platform, an interrogation signal toward the target;

means for receiving, at the observation platform, a response signal passively reflected from the target;

means for determining an observation platform spatial geographic coordinate within the pre-determined geographic reference coordinate system;

means for determining compass heading, angular inclination, and distance to the target, relative to the observation platform spatial geographic coordinate, by using data gathered from the reflected response signal;

means for determining a volume in space spatial geographic coordinate within the pre-determined geographic reference coordinate system, using the compass heading, angular inclination, distance to the target, and the observation platform spatial geographic coordinate; and means for associating the volume in space spatial geographic coordinate with location information corresponding to the volume in space by querying the database.

8. The apparatus of claim 7, further comprising:

means for determining the volume in space spatial geographic coordinate of the volume in space using a global positioning system.

9. The apparatus of claim 7, further comprising:

means for determining the observation platform spatial coordinate using a system, the system selected from the group consisting of a global positioning system, a radio direction finding system and a cellular positioning system.

10. The apparatus of claim 7, further comprising:

means for translating the location information to user data.

11. The apparatus of claim 7, further comprising:

means for determining compass heading, angular inclination, and distance to the target, relative to the observation platform spatial geographic coordinate, by using data gathered from the interrogation signal.

* * * * *